United States Patent
Lee et al.

(10) Patent No.: US 10,584,869 B2
(45) Date of Patent: Mar. 10, 2020

(54) HEATER

(71) Applicant: THE UNITED STATES GOVERNMENT AS REPRESENTED BY THE SECRETARY OF THE ARMY-U.S., Adelphi, MD (US)

(72) Inventors: Ivan Chihang Lee, Burtonsville, MD (US); Helen Tianzhao Lan, University Park, MD (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 464 days.

(21) Appl. No.: 14/809,306

(22) Filed: Jul. 27, 2015

(65) Prior Publication Data

US 2017/0030578 A1    Feb. 2, 2017

(51) Int. Cl.
| | |
|---|---|
| *F23Q 11/00* | (2006.01) |
| *F23C 13/08* | (2006.01) |
| *F23D 14/46* | (2006.01) |
| *F23D 11/36* | (2006.01) |
| *F23D 11/44* | (2006.01) |
| *F23D 14/66* | (2006.01) |

(52) U.S. Cl.
CPC .............. *F23C 13/08* (2013.01); *F23D 11/36* (2013.01); *F23D 11/448* (2013.01); *F23D 14/46* (2013.01); *F23D 14/66* (2013.01); *F23D 2900/00001* (2013.01); *Y02E 20/348* (2013.01)

(58) Field of Classification Search
CPC ............ F23C 13/08; F23C 2900/99008; F23C 13/02; F23C 13/06; F24H 1/0045; F24H 1/145; F24H 3/025; F24H 3/0417; F24H 3/0488; F24H 9/2035; F24H 9/2085; A61M 11/041; F23D 14/18; F23D 14/12; F23D 14/125; F23N 2037/12
See application file for complete search history.

(56) References Cited

U.S. PATENT DOCUMENTS

| | | | | |
|---|---|---|---|---|
| 1,394,894 | A | * 10/1921 | Good | F23D 11/10 |
| | | | | 237/12.3 C |
| 3,411,994 | A | 11/1968 | Wainer | |
| 3,857,668 | A | 12/1974 | Koch | |
| 4,252,620 | A | 2/1981 | Tomita | |
| 4,452,877 | A | 6/1984 | Dhillon | |
| 4,577,611 | A | * 3/1986 | Hagino | F02B 23/00 |
| | | | | 123/193.5 |

(Continued)

OTHER PUBLICATIONS

Debasis Maharana and P. A. Soloman, "Flameless catalytic LPG combustion and its optimization approach," Procedia Technology 24 (2016) 689-695.

(Continued)

*Primary Examiner* — Jason Lau
(74) *Attorney, Agent, or Firm* — Eric B. Compton

(57) ABSTRACT

A heater having a planar metal sheet with a first and second surface. A metal oxide layer is formed on the first surface of the sheet and a combustion catalyst is impregnated into the metal oxide layer. A source of fuel and air is then supplied to the first side of the metal sheet resulting in catalytic combustion which heats the metal sheet. The metal sheet can serve as a cooking stove.

17 Claims, 1 Drawing Sheet

(56) References Cited

U.S. PATENT DOCUMENTS

| | | | | |
|---|---|---|---|---|
| 4,825,846 | A * | 5/1989 | Fraioli | F23D 14/125 126/92 AC |
| 4,894,127 | A | 1/1990 | Wong et al. | |
| 5,037,293 | A * | 8/1991 | Kirby | F23D 14/18 431/328 |
| 5,251,609 | A * | 10/1993 | Thibault | F23D 14/18 126/39 J |
| 7,066,132 | B1 * | 6/2006 | Verbrugge | F02B 77/04 123/193.6 |
| 7,241,136 | B2 | 7/2007 | Lehoux et al. | |
| 8,585,396 | B2 | 11/2013 | Hockaday et al. | |
| 8,691,403 | B2 | 4/2014 | Amakusa et al. | |
| 2005/0250065 | A1 * | 11/2005 | Carbone | F23D 14/06 431/354 |
| 2007/0105060 | A1 * | 5/2007 | Cai | F23C 13/08 431/202 |
| 2011/0165300 | A1 * | 7/2011 | Roychoudhury | F23C 13/00 426/523 |
| 2011/0305881 | A1 * | 12/2011 | Schultz | A61L 33/0088 428/195.1 |
| 2012/0301743 | A1 * | 11/2012 | Walker | B22D 19/08 428/608 |

OTHER PUBLICATIONS

Joyce P. Brayboy, "Students showed off at ARL's 8th annual Symposium" ARL Public Affairs Office, dated Aug. 12, 2014, available online at: https://www.arl.army.mil/www/default.cfm?article=2516.

"Cooking With Materials Science," New Story, A. James Clark School of Engineering, University of Maryland, dated Nov. 20, 2014, available online at: https://mse.umd.edu/news/story/cooking-with-materials-science.

* cited by examiner

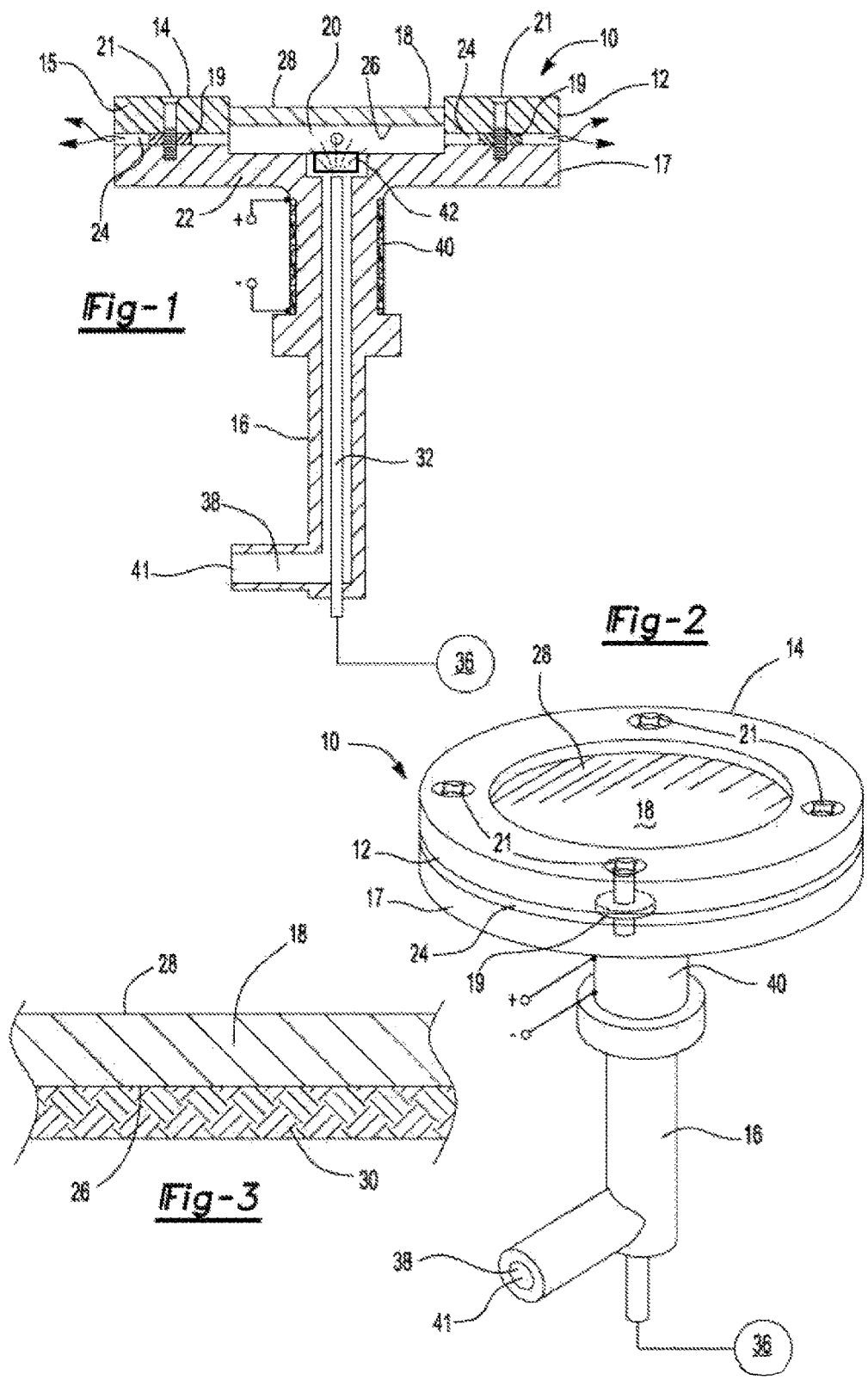

HEATER

GOVERNMENT INTEREST

The invention described herein may be manufactured, used, and licensed by or for the United States Government.

BACKGROUND

I. Field of Use

The present invention relates generally to heaters and, more particularly, to a heater using catalytic combustion and serving as a cooking stove.

II. Description of Related Art

Mobile cooking stoves are necessarily required by the military for use in field operations. The current cooking stove used by the military is the Modern Burner Unit which utilizes conventional combustion to heat the stovetop surface.

The Modern Burner Unit, however, suffers from a number of disadvantages. First, the Modern Burner Unit is loud and releases carbon monoxide in operation. As such, the stove must be properly ventilated in order to ensure the safety of those in proximity to the stove.

The Modern Burner Unit is also inefficient in operation. This inefficiency results from the use of conventional combustion to heat the stovetop surface.

SUMMARY

The present invention provides a heater which may be used as a cooking stove which overcomes the above mentioned disadvantages of the previously known devices.

In brief, the heater of the present invention comprises a metal sheet having a first and second surface. In embodiments, the sheet may, for example, be constructed of aluminum or titanium.

A thick metal oxide layer is formed on the first surface of the sheet. This thick metal oxide may be formed by anodization or cathodization to form a thick porous layer of the metal oxide, or alumina where the metal sheet is made of aluminum.

A combustion catalyst is impregnated within the metal oxide layer. The combustion catalyst preferably comprises platinum or rhodium although other types of combustion catalysts may be alternatively used.

A source of fuel as well as air is then supplied to the first surface of the sheet. The fuel, preferably JP-8 jet fuel, interacts with the catalyst in the metal oxide layer and undergoes catalytic combustion. Such catalytic combustion is highly efficient and reduces, or altogether eliminates, noxious oxide emissions such as carbon monoxide. In practice, the catalytic combustion generates sufficient heat so that the metal sheet can serve as a cooking stove.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a longitudinal sectional view illustrating a heater in accordance with the present invention;

FIG. 2 is a top elevational view of the heater 10; and

FIG. 3 is a fragmentary sectional view illustrating the metal sheet with its oxide layer.

DETAILED DESCRIPTION OF A PREFERRED EMBODIMENT OF THE INVENTION

With reference first to FIG. 1, a heater 10 in accordance with the present invention is illustrated. The heater 10 includes a housing 12 having an upper and generally circular housing top 14 supported by an elongated and vertically extending leg 16. The housing 12 may be either of a one-piece or multi-piece construction and may be constructed of any suitable rigid material provided, however, that the housing top 14 be able to withstand relatively high temperatures of the type used in cooking food.

Preferably, however, the housing top 14 includes an upper ring 15 and lower ring 17. The rings 15 and 17 are separated from each other by a plurality of annular spacers 19 (FIG. 1) which form a slot 24 for exhaust gases around the housing top 14. A threaded fastener 21 (FIG. 1) extends through each spacer 19 and secures the rings 15 and 17 together.

A metal sheet 18 is supported in the housing top 14 in any conventional fashion and so that a chamber 20 is formed between the metal sheet 18 and a base 22 of the housing top 14. The metal sheet 18 is preferably constructed of aluminum and includes a first side 26 which forms a top wall of the chamber 20, and a second side 28 which is open exteriorly of the housing 12. The first side 26 of the metal sheet is covered with a thick oxide layer of the same metal forming the sheet 18. Thus, where the sheet 18 is constructed of aluminum, the oxide layer 30 is formed of alumina.

Any conventional means may be used to form the oxide layer 30 on the first side 26 of the metal sheet 18. However, in the preferred form of the invention, the oxide layer 30 is formed by cathodization which produces not only a thick, but also a porous layer 30 of oxide. Other methods, such as anodization, may also be used to form the oxide layer 30.

EXAMPLE

The aluminum 6061 wafers were obtained which have a 100 mm diameter and were cut from a 0.813 mm thick sheet. The wafers were obtained polished on one side with a #8 polish (roughness of 20 to 30 nm) and the other side bare. The polished side was either obtained with a type 2 anodization, or anodized or cathodized according to the variables below.

The wafers were prepped with a multi-step cleaning process (chemical polishing). First, they were sprayed with acetone, then iso-propanol alcohol. Next, they were soaked in 5% NaOH solution for two minutes and then in 25% $HNO_3$ solution for one minute (Raj & Mumjitha, 2014).

For in-house cathodization, the following parameters were kept constant. The electrolyte was 1.0 M oxalic acid ($H_2C_2O_4$). The temperature was not controlled because it has almost no effect on the alumina pore density. Two variables were tested to find the effect on structural features. The times tested were 20, 40, 60, 80, and 100 minutes. The current densities were 1, 2, 3, 4, and 5 $A/dm^2$. Current flowed into a strip of aluminum foil, then the aluminum wafer, next oxalic acid electrolyte, and into the gold wire; this process deposited a layer of porous aluminum oxide onto the aluminum wafer. In embodiments, the cathodization takes place at from about 2 to about 6 A/dm2 and for about 60 to 100 minutes.

For in-house anodization comparison, the wafer was anodized at 0.87 A/dm² and 80 minutes. The electrochemical circuit was just the opposite of that cathodization.

After anodization or cathodization, the samples were washed with deionized water. Next, the samples were impregnated with a platinum (IV) nitrate solution. The wafers were then put into the furnace at 500° C. to create a platinum (IV) oxide catalyst layer.

The oxide layer 30 is impregnated with a catalyst designed to form a catalytic combustion with hydrocarbon fuel. Any conventional catalyst such as platinum or rhodium may be used to impregnate the metal oxide layer 30.

Referring again to FIG. 1, a fuel supply passageway 32 is formed through the housing support leg 16 so that an upper end of the fuel supply passageway 32 is open to the chamber 20. The other end of the fuel passageway 32 is fluidly connected to a pressurized source 36 of hydrocarbon fuel, such as JP-8 jet fuel.

An annular air passageway 38 surrounds the fuel passageway 32 and fluidly communicates with ambient air through an air inlet 41. Air flowing through the air inlet 41 and air passageway 38 intermixes with the vaporized fuel from the fuel source 36 in an alumina porous mixing foam 42 immediately below the chamber 20. This construction ensures full intermixing of the air and the fuel as the air/fuel mixture enters into the chamber 20 and impinges against the metal oxide layer 30.

A heating element 40 is attached to the housing leg 16 so that the heating tape 40 surrounds a portion of both the air passageway 38 and the fuel passageway 32. This heating tape 40 preheats the air and vaporizes the fuel prior to the introduction of the fuel/air mixture into the chamber 20 and against the oxide layer 30 to a temperature sufficient to initiate catalytic combustion. Once catalytic combustion is initiated, the catalytic combustion heats the metal sheet 18 in the desired fashion while the exhaust products from the catalytic combustion exhaust through the exhaust passageways 24 in the housing top 14. However, since the catalytic combustion is much more efficient than conventional hydrocarbon combustion, the emission of noxious gases, such as carbon monoxide, is either greatly reduced or eliminated altogether.

In practice, the heater 10 of the present invention may be used as a cooking stove and is particularly useful for applications such as mobile military use. Other applications for the heater 10, however, are clearly within the scope of this invention. For example, the heater of the present invention could be in the form of a heated pot which is used for cooking.

From the foregoing, it can be seen that the present invention provides a heater, which is particularly useful as a mobile military stove, which is not only efficient in operation, but eliminates the noxious gases from the previously known mobile military stoves. Having described my invention, however, many modifications thereto will become apparent to those skilled in the art to which it pertains without deviation from the spirit of the invention as defined by the scope of the appended claims.

The invention claimed is:

1. A heater comprising:
a metal sheet having a first and second surfaces,
a porous metal oxide layer formed directly on said first surface of said metal sheet,
a combustion catalyst impregnated within said porous metal oxide layer, the catalyst effecting flameless catalytic combustion,
a source of fuel, and
a chamber which the first surface faces,
wherein fuel interacts with the catalyst in the porous metal oxide layer and undergoes flameless catalytic combustion which generates heat,
wherein the second surface is an exterior surface where cooking takes places and heat generated by the flameless catalytic combustion at the first surface of the sheet is conductively transferred through the metal sheet to the second surface raising the temperature of the second surface to a temperature suitable for cooking food.

2. The heater as defined in claim 1 wherein said metal sheet comprises a sheet of titanium metal or aluminum metal.

3. The heater as defined in claim 1 wherein said porous metal oxide layer comprises an oxide of the same metal forming the metal sheet.

4. The heater as defined in claim 3 wherein said metal oxide layer is formed by anodization of the first surface of said metal sheet.

5. The heater as defined in claim 3 wherein said metal oxide layer is formed by cathodization of the first surface of said metal sheet.

6. The heater as defined in claim 1 wherein said catalyst comprises platinum metal or rhodium metal.

7. The heater as defined in claim 1 wherein said fuel comprises hydrocarbon fuel.

8. The heater as defined in claim 7 wherein said fuel comprises JP-8 jet fuel.

9. The heater as defined in claim 1 and comprising a housing, said metal sheet being supported by said housing, and a fuel passageway and air passageway being formed through said housing, each passageway having an outlet in the chamber open to a first side of said metal sheet.

10. The heater as defined in claim 9 and comprising a heating element attached to said housing and surrounding a portion of said passageways which preheats the air and vaporizes said fuel entering the chamber via said passageways.

11. The heater as defined in claim 1 wherein said heater is configured as a cooking stove.

12. The heater according to claim 5 where the cathodization occurs from about 4 to about 5 A/dm² for from about 80 to about 100 minutes with oxalic acid to form porosity in the metal oxide layer.

13. The heater as defined in claim 11, wherein the catalytic combustion reduces or eliminates carbon monoxide emissions during cooking.

14. The heater as defined in claim 1, further comprising: a housing including an upper ring and a lower ring separated from each other by a plurality of spacers which form a slot for exhaust gases around the housing.

15. The heater as defined in claim 14, further comprising: a plurality of threaded fasteners, with one fastener extending through each spacer, to secure the upper and lower rings together.

16. The heater as defined in claim 10, further comprising: a porous foam positioned in the chamber proximate to the outlets of said passageways, wherein air intermixes with the vaporized fuel in the porous foam.

17. The heater as defined in claim 16, wherein air/fuel mixture after passing through the porous foam impinges against the porous metal oxide layer.

* * * * *